United States Patent
Phillips

[11] 3,829,066
[45] Aug. 13, 1974

[54] PARTICULATE MATERIAL MIXING MACHINE

[76] Inventor: Charles E. Phillips, Box No. 75, Downsville, Wis. 54735

[22] Filed: Apr. 4, 1973

[21] Appl. No.: 347,812

[52] U.S. Cl.................................... 259/3, 259/14
[51] Int. Cl............................................. B01f 9/06
[58] Field of Search............... 259/3, 14, 15, 30, 31, 259/57, 81, 89, 90, 175, 176, 177 R

[56] References Cited
UNITED STATES PATENTS

| | | | |
|---|---|---|---|
| 3,088,711 | 5/1963 | Phillips | 259/3 |
| 3,259,372 | 7/1966 | Phillips | 259/3 |
| 3,269,707 | 8/1966 | Phillips | 259/3 |
| 3,552,721 | 1/1971 | Phillips | 259/3 |
| 3,558,108 | 1/1971 | Jackson | 259/177 |
| 3,752,445 | 8/1973 | Nowak | 259/3 |

Primary Examiner—Robert W. Jenkins
Attorney, Agent, or Firm—Dugger, Johnson & Westman

[57] ABSTRACT

A particulate material mixing machine having a rotatable open ended drum with scoops attached thereto to elevate material within a stationary hood enclosing the drum open end and material received from a stationary hopper within the drum. Drum mechanism including troughs elevates material and directs it into the hopper, a baffle attached to the hood blocking any substantial flow of material from the drum to the scoops except that which passes through the hopper. A hood discharge chute receives material elevated by the scoops provided the closure therefor is open, and if closed the material is moved thereover to the inlet chute of the auger assembly which flings the material rearwardly to descend into the drum substantially throughout the axial length thereof. In one embodiment the scoops are stationary while in the other embodiment some of the scoops are pivotable relative the drum.

21 Claims, 8 Drawing Figures

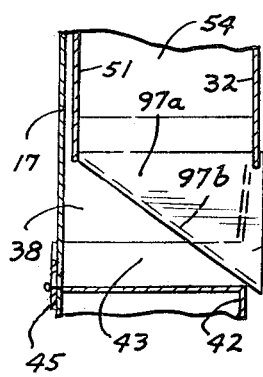
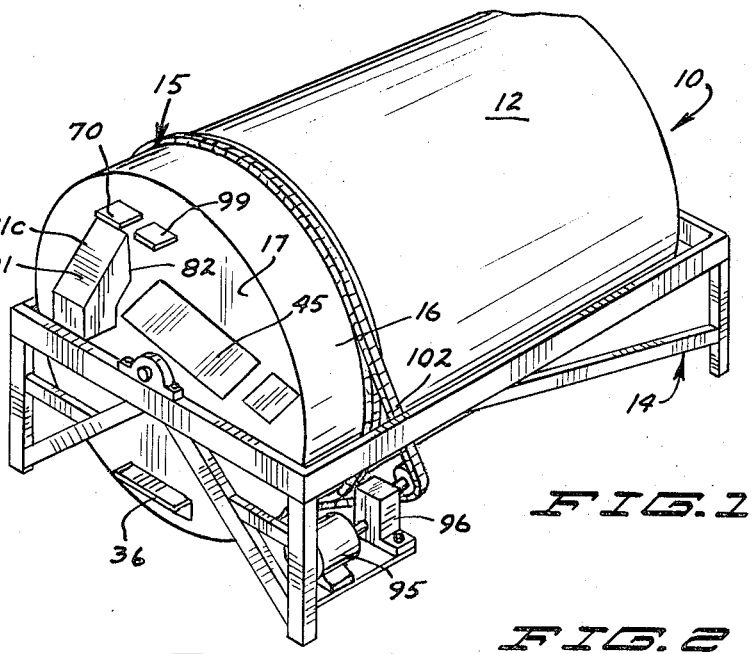
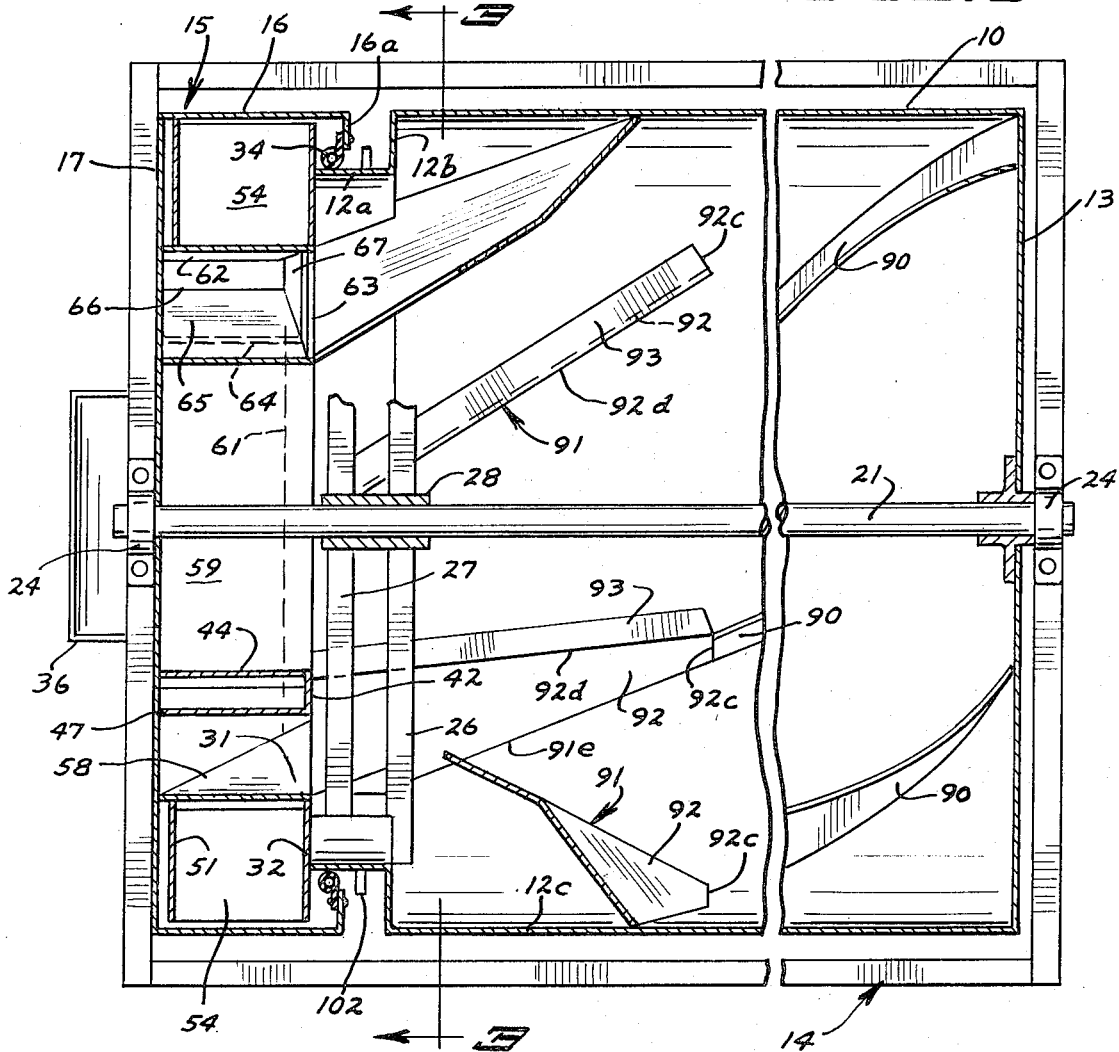

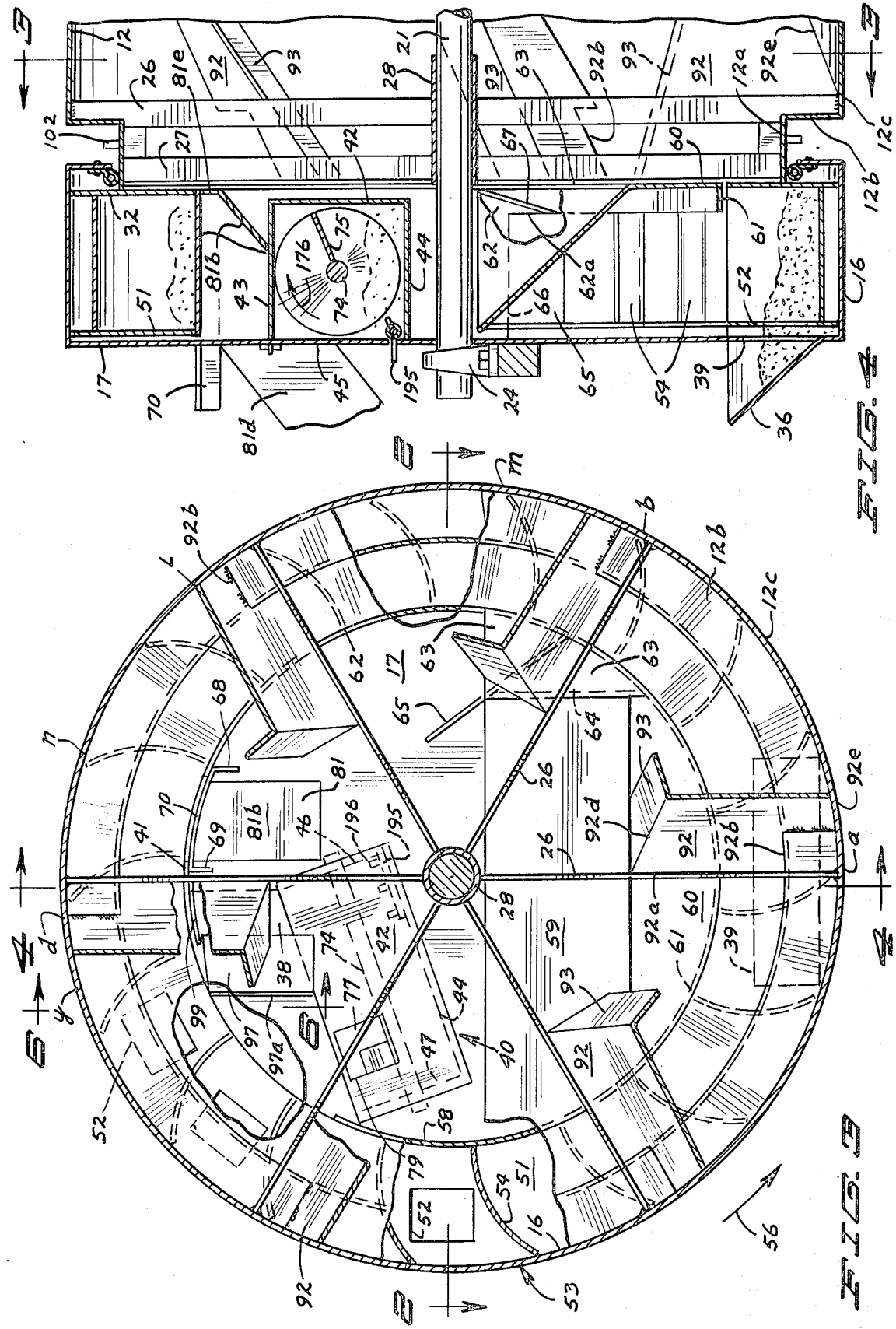

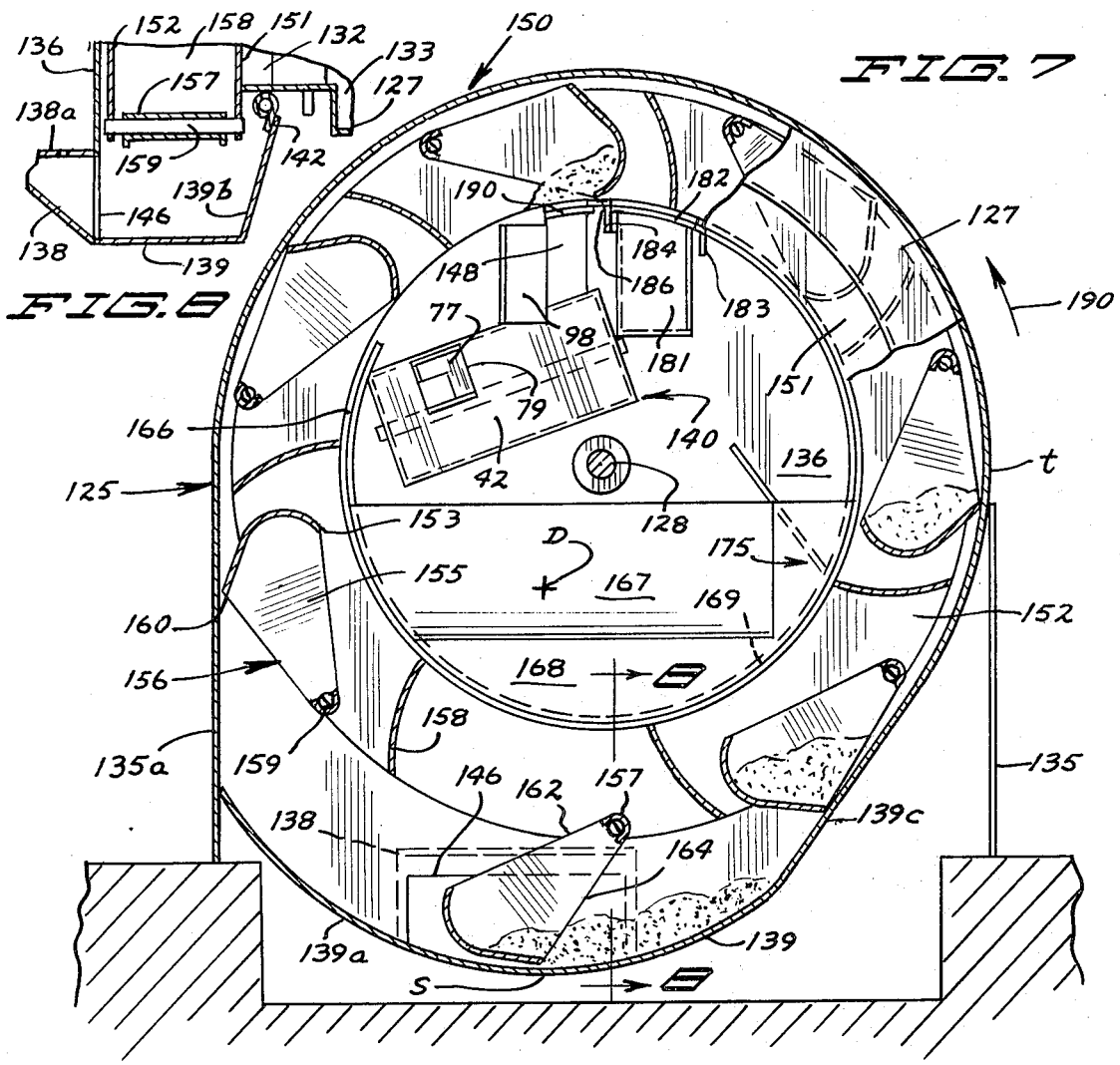
FIG. 7
FIG. 8
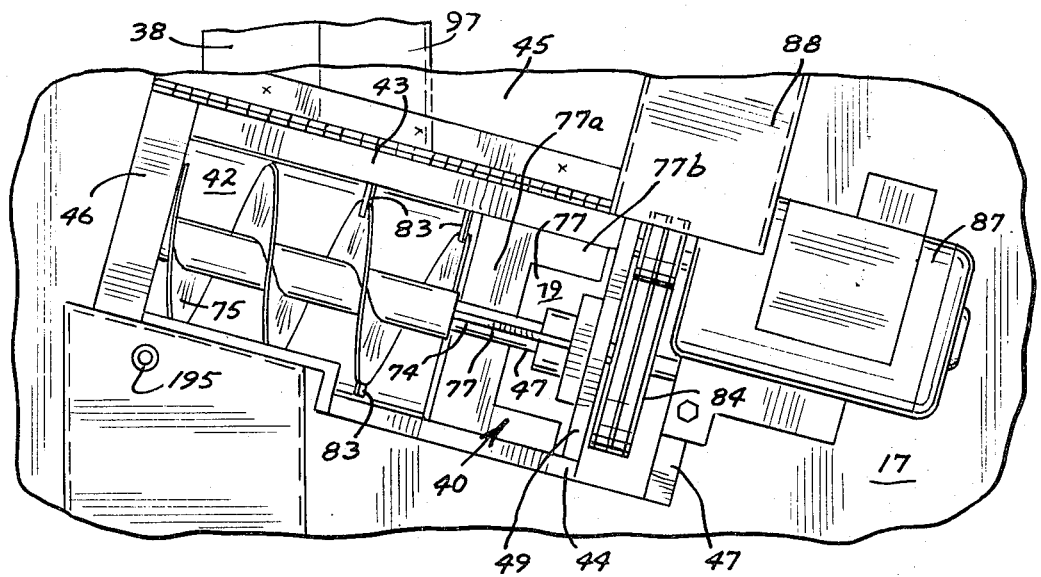
FIG. 9

3,829,066

PARTICULATE MATERIAL MIXING MACHINE

BACKGROUND OF THE INVENTION

A particulate material mixing machine having a stationary hood enclosing the one end of a rotary drum, said drum and hood having cooperating mechanisms for feeding material from the hood into the drum and alternately discharging material from the drum through the hood discharge chute.

With prior art machines such as disclosed in my U.S. Pat. Nos.: 3,088,711; 3,259,372; 3,269,707 and 3,552,721, material is not mixed as fast as desirable, and in the last three mentioned patents, structure has been provided in the rear half of the drum to facilitate mixing material. Such structure increases manufacturing costs.

Also, it is old to mount a rotary beater assembly on the exterior surface of a hood end wall to receive material from within a rotary dum and to discharge material back through the hood end wall to move back into the drum. Such a beater assembly includes a rotary shaft and a plurality of beaters extending radially outwardly thereof but does not include an auger nor fan blades, and discharges particles only to descend into the hood and the drum closely adjacent the hood (not even closely approaching at least half the axial distance to the drum rear wall). As a result, structure has to be provided in the rear half of the drum such as disclosed in my last three mentioned patents, which increases manufacturing costs, and still does not provide the speed of mixing obtained with this invention. In order to solve problems of the above mentioned nature as well as obtain other advantages, this invention has been made

SUMMARY OF THE INVENTION

The invention is directed to providing structure attached to a fixed hood for blocking any substantial flow of material in the rotary drum into the path of movement of the lower scoops attached to the drum, a stationary hopper for receiving material from the drum and directing material into the path of movement of the scoops, and an auger assembly for selectively forceably discharging the material elevated by the scoops to descent by gravity substantially throughout the axial length of the drum.

An object of this invention is to provide new and novel structure to receive material from transfer mechanism of a rotary drum and discharge the received material into the drum throughout at least the major portion of the axial length of the drum to increase the speed of mixing material.

BRIEF DESCRIPTION OF THE DRAWINGS

The invention is illustrated with reference to the drawings in which corresponding numerals refer to the same parts and in which:

FIG. 1 is a perspective, somewhat schematic view of the first embodiment of the particulate material mixing machine of this invention;

FIG. 2 is an enlarged vertical transverse sectional view generally taken along the line and in the direction of arrows 2—2 of FIG. 3 with a central portion broken away, said view more clearly illustrating the mechanism for transferring material in the stationary hood into the rotary drum and for positively conveying the material to a substantial elevation where it is selectively discharged exterior of the machine or flung into the drum or to descent to the general level of the material in the drum and also the structure for causing the material in the drum to be more thoroughly mixed and directed into the transfer mechanism;

FIG. 3 is an enlarged vertical transverse sectional view generally taken along the line and in the direction of the arrows 3—3 of FIG. 4 to more fully illustrate the transfer mechanism including mechanism for controlling the discharge of material, portions of said view being broken away at various axial positions to more fully illustrate other portions of the transfer mechanism;

FIG. 4 is an enlarged, fragmentary, vertical longitudinal cross-sectional view generally taken along the line and in the direction of arrows 4—4 of FIG. 3, the control door being shown in a position for preventing flow of material into the discharge chute;

FIG. 5 is an enlarged side view more clearly illustrating the auger apparatus;

FIG. 6 is a fragmentary vertical longitudinal cross-sectional view generally taken along the line and in the direction of the arrows 6—6 of FIG. 3;

FIG. 7 is a vertical transverse sectional view illustrating the second embodiment of the particulate material mixing machine of this invention, parts being broken away at various axial positions whereby the troughs, mixing blades, and spiders are not shown and most of the adjacent scoop mounting flange structure and rear portion of the sump are not shown; and FIG. 8 is a fragmentary, vertical longitudinal cross-sectional view generally taken along the line and in the direction of arrows 8—8 of FIG. 7.

DESCRIPTION OF THE PREFERRED EMBODIMENT

Referring in particular to FIGS. 1 and 2 there is illustrated a perspective view and a longitudinal horizontal cross-sectional view of the particulate material mixing machine, generally designated 10, of the first embodiment of the invention. The apparatus 10 includes a large cylindrical drum 11 having a tubular outer wall 12 and a rear end wall 13 mounted to revolve on its axis and supported on a shaft 21. The shaft 21 at either axial end is mounted on appropriate portions of the frame members of the frame generally designated 14, by mounting members 24.

There is provided a stationary hood, generally designated 15, having a tubular outer wall 16 and a stationary end wall 17, the tubular outer wall 16 being of a substantially larger diameter than that of the axially adjacent reduced diameter and portion 12a of the tubular wall 12 and concentrically located relative to the front axial end portion 12a of the drum. As may be noted from FIGS. 2 and 4, a portion of a tubular wall 16 overlays the reduced diameter portion 12a of the tubular drum wall. Extending axially through the drum and at one end projecting through the end wall 13 and at the opposite end through the end wall 17 is the shaft 21. Rotatably mounted on the shaft adjacent the hood is a mounting member 28. A plurality of radial spider members 26 at their one ends are fixedly connected to the member 28 and at the opposite ends to drum wall annular portions 12a, 12c. More closely adjacent the hood end wall than spiders 26, there is provided a second plurality of radially extending spider members 27 that at the one ends are welded to the annular member 28 which mounts said spider members 27 on the shaft and at the opposite ends are welded to the drum wall portion 12a closely adjacent the annular terminal edge portion of wall portion 12a. A mounting member 29 is rotatably mounted on the shaft and secured to wall 13. If shaft 21 is stationary as disclosed in U.S. Pat. No. 3,269,707, then members 28, 29 are bearing members while if the shaft is rotatably mounted then members 28, 29 may be welded to the shaft.

An annular mounting flange 32 is welded to the forward terminal edge of the tubular wall portion 12a to extend both radially outwardly and inwardly of said terminal edge. The outer diameter of the flange 32 is slightly less than the inner diameter of the hood tubular wall 16; and the inner diameter is substantially larger than the maximum diameter of member 28 but substantially less than the inner diameter of the drum tubular wall portion 12a. Thus member 28 and flange 32 provide an annular opening 31, other than for spider members 26, 27, to permit axial movement of material into and out of the confines of the drum tubular wall.

Referring to FIG. 2, it is to be noted that the hood has an inwardly extending annular flange 16a located axially between the radially extending annular portion 12b of the drum wall 12 and the mounting flange 32, a resilient annular seal member 34 being mounted on said annular flange 16a to bear against the tubular outer wall portion 12a of the drum to form a seal therewith. Portion 12b joins the reduced diameter portion 12a to the main body portion 12c of the drum.

In order to permit loading the drum while it is rotating, a chute 36 is welded to the hood end wall for directing material downwardly through the rectangular opening 39 provided in said end wall adjacent the lowermost axially extending portion of the hood tubular wall. The lowermost horizontal edge of the opening 39 is located at a lower elevation than the lowermost portion of the inner annular edge of flange 32. In order to permit particulate material being moved through the chute 36 and port 39, and thence transferred into the tubular drum housing while the said drum housing is rotating and at the same time to selectively permit discharge of material, there is provided the transfer mechanism generally designated 50 that includes an auger assembly, generally designated 40, and control mechanism which will be described hereinafter.

The transfer mechanism includes the aforementioned annular mounting flange 32 and a second annular mounting flange 51 that has substantially the same inside and outside diameters as that of flange 32. Mounting flange 51 is fixedly attached to flange 32 and retained in axial spaced relationship by the structure to be described hereinafter. However, at this time it is to be noted that the mounting flange 51 is retained axially adjacent the hood end wall as shown in FIG. 4 and that it is of a greater radial dimension than the maximum radial distance to the lower edge of the inlet port 39. Further the inner peripheral edge of flange 51 is located radially more adjacent the shaft 21 than any portion of the peripheral edge of port 39. In order to permit the flow of the material from port 39 onto the hood tubular wall in the space axially between the flanges 32 and 51, flange 51 has a plurality of circumferentially spaced cutouts 52.

A plurality of scoop members 54 are welded at axially opposite edges to flanges 32 and 51 respectively in circumferentially spaced relationship to extend completely around the circumference of the hood within the confines of said hood. As may be noted from FIG. 3, each of the scoops is arcuate in transverse cross-section. The adjacent portions of the mounting flanges 32, 51 form end walls for the scoop members. Each of the scoops opens in the direction of rotation of the drum which is indicated by arrow 56.

Secured to the hood end wall and made up of a plurality of joined together sections is a baffle, said baffle including an arcuate section 58 that extends arcuately adjacent to the inner circumferential edges of the scoop mounting members, has an arcuate edge joined to the hood end wall, and has a terminal axial extending top edge angularly intermediate the horizontal plane of the axis of rotation of the drum and the axially extending, vertical wall of the auger inlet chute 38 that is forwardly in the direction of rotation of the drum. A generally planar baffle section 59 has its front edge joined to the hood end wall, is inclined downwardly at a relatigely steep angle in a direction toward the rear wall, and has its rear edge substantially more closely axially adjacent to the rear wall than the mounting member 32, or in the plane of mounting member 32, and has one edge joined to the lower edge of arcuate section 58. The rear edge of inclined section 59 is at a lower elevation than shaft 21. A vertical, transverse section 60 has its upper edge joined to the rear edge of section 59 and has a circumferential edge joined to the rear edge of arcuate flange section 61. Section 61 has an outer radius of curvature slightly less than the inner radius of curvature of mounting member 32, is closely adjacent an arcuate portion of mounting member 32, and extends a distance axially substantially more closely adjacent the hood end wall than mounting member 32. The axial length of flange section 61 is many times greater than the clearance between the flange section and the mounting member. One transverse edge of flange section 61 is joined to section 58 and the opposite transverse edge is joined to a transverse edge portion of an arcuate baffle section 62 at about the elevation of the juncture of sections 59, 60. One arcuate edge of section 62 is joined to the hood end wall while the opposite arcuate edge is spaced about the same distance from the hood end wall as section 60. The axially extending edge of section 62 that is opposite flange section 61 in part terminates above the discharge chute 81. Further, section 62, flange section 61 and arcuate section 58 have substantially the same radii of curvature.

In order to permit material in the drum being fed into the path of movement of the scoops 54, there is provided a hopper that has a vertical axially extending plate 64. Plate 64 is triangular and has one edge joined to inclined baffle section 59, a vertical second edge, and a third top edge at the elevation of the front edge of section 59. A second hopper plate 63 has a vertical first edge joined to the second edge of plate 64 and the vertical edge of section 60, a second top edge at the elevation of the top edge of plate 64 and an arcuate third edge joined to the adjacent portion of the edges of flange section 61 and arcuate section 62 that are remote from the hood end wall. Plate 63 is parallel to the hood end wall and perpendicular to plate 64.

An inclined planar plate 65 is joined to and extends between the hood end wall and plate 63, has a top edge at a substantially higher elevation than the top edge of plate 64 and substantially more closely adjacent shaft 21 than plate 64, and has a bottom edge that in part is extended along the juncture of baffle sections 61, 62. Plate 65 extends parallel to the axis of rotation of the drum and is inclined downwardly and away from the vertical plane of said axis. The lower corner portion of baffle section 62 that is adjacent the hood end wall is cut away to in conjunction with the bottom edge of plate 65 provide a hopper outlet 66 that opens into the path of movement of the scoops. The axial length of the cutout is the same as the spacing of flange section 61 from the hood end wall, the arcuate edge portion 62a of section 62 forming one edge of the hopper outlet. A second plate 67 has a top edge adjacent the top edge of plate 63 and is inclined downwardly toward the hood end wall. Plate 67 has a second edge joined to the adjacent portion of plate 65, an arcuately curved third edge joined to baffle section 62 along edge 62a, and a fourth edge joined to baffle section 62 and extending between the first and third edges. Plates 65, 67 are inclined at angles that the particulate material normally will flow freely downwardly along the surface thereof. Further plates 63, 64 are joined to the adjacent portions of baffle sections and the inclined plates; and serve as reinforcing members.

The top edge of plate 67 along with the portions of baffle section 62, plate 65, and the hood end wall at the same elevation provide a hopper inlet, the hopper inlet being located horizontally on the opposite side of shaft 21 from baffle section 58 and at a slightly lower elevation than shaft 21. Further, the hopper inlet is located in a horizontal direction more remote from shaft 21 than the discharge chute inlet and at a substantially lower elevation. The hopper outlet is located at a substantially higher elevation than port 39, and angularly between port 39 and the inlet of discharge chute 81 in the direction of arrow 56 angularly in advance of port 39.

An arcuate discharge closure member (door) 70 is provided to selectively block the discharge chute inlet. As may be noted from FIG. 3, the trailing edge of the closure member underlies the leading edge portion of baffle section 62. The closure 70 is slidably extended through an arcuate slot provided in the hood end wall, is of an axial length to, in the closed position of FIG 4, be closely adjacent and underlie a portion of mounting flange 32, and has an axially extending end portion located exteriorly of the hood end wall. The closure 70 may be provided with handles, or appropriate lever mechanism connected thereto, for moving the closure between the solid line position of FIG. 4 and a withdrawn position to at least partially unblock the discharge chute inlet. In order to mount the closure 70 for slidably movement, there are provided bracket members 68 and 69 at opposite longitudinal edges of the closure 70, said brackets having shoulders against which said closure abuts.

The chute 81 has an inclined bottom wall 81b that extends axially adjacent the spider members 27 and a top wall 81c that extends axially slightly inwardly of the end wall 17. The chute also includes sidewalls 81d. To the angular advanced sidewall there is joined an upwardly extending rectangular portion and to the bottom wall 81b there is joined an upright arcuate portion 81e. The last two mentioned portions extend to a higher elevation than the maximum elevation of the bottom wall to preclude a substantial amount of material that moves over the leading edge of baffle section 62 being carried by inertia beyond the confines of the discharge chute. The chute 81 is mounted to have an intermediate portion extend through the port 82 formed in the hood end wall 17, the inner portion being located within the confines of the hood and the remaining portion extending forwardly of the hood end wall. The chute 81 has a discharge opening which is located at about the same elevation as shaft 21.

An arcuate baffle section 41 extends between the adjacent, vertical sidewalls of the discharge chute 81 and the inlet chute 38 of the auger assembly, generally designated 40, whereby when the door 70 is closed, material will be moved by the scoops over the door and section 41 to fall into the inlet of the auger inlet chute. The auger assembly includes an auger housing having a side wall 42 located axially between the hood end wall and spiders 27; top and bottom walls 43, 44 that extend between and are joined to the sidewall 42 and the hood end wall, a door 45 hingedly connected to the hood end wall to permit access to the interior of the auger housing; an end wall 46 closely adjacent chute 81; and an end wall 47 remote from wall 46, horizontally between chute 81 and the part of the flanges 32, 51 in the direction 56 from chute 81. Latch mechanism (not shown) is provided by retaining the door 45 in a closed position.

The auger housing is of a substantially longer length (dimension between end walls 46, 47) than the width (dimension between the door 45 in a closed position and sidewall 42) thereof. The auger housing is located vertically between the baffle 59 and the inlet to chute 81, and horizontally between chute 81 and baffle section 58. Further, the auger housing extends predominently horizontally but is inclined downwardly, for example, about 20° whereby end wall 47 extends to a substantially lower elevation than the juncture of housing walls 44, 46.

A partition wall 49 is provided in the auger housing and is joined to housing walls 42, 43, 44 to be parallel to walls 46, 47 and substantially more closely adjacent wall 47 than wall 46. Walls 46, 47, 49 rotatably mount an elongated auger shaft 74 to have an axis of rotation parallel to walls 42–44 and in a plane perpendicular to the axis of rotation of shaft 21. The lowermost portion of shaft 74 is at a higher elevation than shaft 21. A spiral auger blade 75 is joined to shaft 74 to be rotated thereby, have one end closely adjacent end wall 46, and an opposite end between walls 49, 46 and substantially more closely adjacent the partition wall 49 than wall 46. The blade 75 is of a configuration to move material in the auger housing toward the partition wall when the auger is rotated in the direction of arrow 76. Located axially between the auger blade 75 and partition wall 49 and mounted on the shaft 74 to rotate therewith is a fan having a plurality of angular spaced, fan blades 77. Each fan blade is substantially planar, is located in a plane of the axis of rotation of the shaft 74 and is generally L-shaped. That is each fan blade has a radially inner rectangular portion 77a joined to the shaft and a radially outer rectangular portion 77b, portions 77a, 77b having a coextensive radially extending edge closely adjacent the auger blade while the opposite radially edge of portion 77b is closely adjacent the partition wall and the opposite edge of portion 77a is about midway between the spiral blade and the partition wall. The vertical wall 42 of the housing has a discharge port 79 located axially between the partition wall and the adjacent end of the spiral blade, radially outwardly of the portion of the shaft that mounts the fan, and that extends vertically between the top wall 43 and somewhat above or adjacent to the plane of the axis of rotation of the shaft 74 that is parallel to the top wall 43. As a result, as the fan and auger blade are rotated in the direction of the arrow 76, material fed by the spiral blade into the path of travel of the fan is flung outwardly of the auger housing in both an upwardly and rearward direction to fall on the material in the drum (or the drum wall) between the spiders and the drum end wall. The lower end of the chute 38 opens through the housing top wall 43 closely adjacent the end wall 46.

To help break up chunks and clumps of material in the auger housing, the portion of the spiral blade adjacent the fan has angularly spaced, radially outwardly extending lugs 83 extending outwardly beyond said portion of the spiral blade. That is, the axially extending portion of the spiral blade on which the lugs are mounted extends outwardly of the shaft a substantially shorter distance than the remainder of the spiral blade that extends axially toward end wall 46.

A sheave 84 is mounted on the shaft 74 axially between walls 47, 49 to have a belt extend therearound and through an opening in the hood end wall for being driven by a sheave on the motor shaft of the motor 87 that is mounted on the hood end wall to extend outwardly thereof. A housing 88 is hingedly mounted in the hood end wall to cover the drive from the motor to the auger shaft.

In order to facilitate thorough mixing of the material and movement of the material from within the confines of the drum toward the hood and up and into the inlet of the hopper; especially when the drum is in a nearer empty state, there is provided a plurality of troughs, generally designated 91 and spiral mixing blades or spiral flanges 90. For the particulate machine illustrated there are provided six circumferentially spaced troughs (see FIG. 2–4, each of these views illustrating the troughs at the same point of the rotary cycle). Also for the particular machine illustrated, there are provided three spiral mixing blades 90 that are fixed on and project radially inwardly from the interior surface of the drum wall 12. These blades are preferably made of spiral form as indicated, and angularly pitched so that each blade preferably extends circumferentially in the drum in the general neighborhood of 180° at an angle of approximately 45° to a plane perpendicular to the axis of rotation of the drum. Each blade has one end joined to drum end wall 13 and an opposite end in part welded to the rear edge of the respective trough 91, there being one blade for every other trough. As the drum rotates, these blades feed material toward the troughs, and at the same time the material spilling over the inner radial edge of the blade becomes more thoroughly mixed than if the blades were not provided.

Each of the troughs 91 is generally of the same construction and is welded to the drum to rotate therewith. Accordingly the angular position of the troughs constantly varies as the drum rotates and therefore for purposes of facilitating the description of the construction of the troughs, the only trough described in this paragraph will be the lowermost trough appearing in FIGS. 3 and 4. When the lowermost trough is in the FIG. 3 position the generally planar web plate 92 is located in a vertical plane that in a horizontal plane is inclined in a forward direction to more closely approach the vertical plane of the axis of rotation of the drum. The front vertical edge portion a short distance rearwardly of the front vertical edge 92a of the plate 92 is welded to the leading surface portion of the adjacent spider 27, the plate having a cutout 92b providing generally right angles edges welded to the adjacent parts of drum portions 12a, 12b. The plate has a rear edge 92c that extends radially inwardly from the drum wall about the same distance as blades 90 and the radial dimensions of wall portion 12b. Thus the front edge 92a is of a substantially greater length than edge 92c and extends vertical to a position much closer to the horizontal plane of the axis of rotation of the drum than edge 92c. Accordingly the edge 92d that extends between and is joined to the parts of the edges 92a, 92c most remote from vertically adjacent parts of the drum, in a forward direction, more closely approaches both the vertical and horizontal planes of the axis of rotation of the drum. The fourth edge 92e that is opposite edge 92d is welded to the drum. The trough also includes a right angle flange 93 that is joined to plate 92 to extend away therefrom in a direction away from the vertical plane of the axis of rotation of the drum.

As the drum rotates the lowermost trough 91 from angular position (0° position) a of the drum to the position of the trough shown at angular position b, the trough both elevates particulate material and directs it axially toward the hood end wall. Further rotation of the trough from angular position b toward angular position c brings edge 92a to a higher elevation than the inlet of the hopper, and thence material elevated by the trough flows into the hopper and thence into the path of travel of the scoops. The excess material that cannot be handled by the troughs in moving from position a to position d and that does not flow into the hopper either directly flows over flange 93 directly back to the generally level of material in the drum or onto baffle 59 and thence to the generally level of material in the drum.

MOunted on the hood end wall in underlying relationship to the scoops in their upper positions, located angularly between the auger inlet chute 38 and the top terminal edge of the baffle 58 and in abutting relationship to the axially extending wall of the chute that is advanced in the direction of rotation of the drum is a chute 97. The chute 97, is joined to the hood end wall at the top and is inclined downwardly in an axially rearward direction at a sufficiently steep angle that particulate material will flow thereover under gravity flow, the rearward edge of the chute terminating horizontally between auger housing rear wall 42 and the front edges of the spiders 27. The chute 97 (see FIG. 6) includes a main body portion 97b of a substantial transverse width and extends between chute 38 and the vertical, triangle flange 97a that extends axially and is joined to the edge of portion 97b remote from chute 38. Flange 97a is provided to minimize material descending from the scoops falling angularly in advance of chute 97. Material moving down on chute 97 either falls onto baffle 59, or falls into the confines of the tubular drum wall.

Although not essential to the invention, advantageously a closure 99 is mounted by the hood end wall in the same manner that closure 70 is mounted. Closure 99 is mounted above the inlet of the auger inlet chute 38 for movement between a position to permit material moved over baffle section 41 by the upper scoops to move onto chute 38, and a position blocking material flow into chute 38. The material that is moved over closure 99 by the scoops descends onto chute 97.

Suitable power actuating mechanism for the drum 10 is diagrammatically shown in FIG. 1 and may comprise an electric motor 95 operably connected through suitable speed reduction mechanism 96 to a sprocket, chain and a ring gear or gear belt 102 affixed on the outer periphery of the tubular wall of the drum. Thus, the drum may be rotated at a suitable speed, usually in the order of two to five rpm in the direction of the arrow 56.

The structure of the first embodiment of the invention having been described, the operation thereof will now be briefly set forth. Assuming that the drum is in an emptied condition, and being rotated and closure member 70 is closed, the particulate material to be mixed is dumped into chute 36 where under the action of gravity it flows through the hood inlet port 39 and thence through the cutouts 52 of the mounting flange 51 that are located adjacent to and open to the inlet port 39. The material flows through the cutouts under the action of the gravity to the bottom of the hood tubular wall 16 to be located adjacent position $a$ (0° drum rotary position) axially between flanges 32, 51 and circumferentially between an angularly adjacent pair of scoops 54. As the drum rotates to move a scoop from position a angularly in the direction of rotation of the drum (arrow 56) to a more elevated condition, the material is precluded from falling into the confines of the drum wall 12 by mounting member 32 and baffle sections 60, 61. As a scoop 54 is angularly advanced from a position generally in the area of position $a$, the material being moved over the hood tubular wall moves radially inwardly over the scoop toward the radially inner edge thereof. When the scoop has been advanced to about position $b$ (about 65° drum rotary position), the inner edge of the scoop is adjacent the lower edge of plate 65; and as the scoop advances past the hopper outlet, a small quantity of material may fall over the inner edge of the scoop into the path of movement of the following scoop. At the time the scoop has been advanced to position $m$ (about 80° drum rotary position), the inner edge of the scoop is adjacent the upper edge of the hopper outlet, and thence as the scoop continues to be rotated in the direction of arrow 56, the material is moved over the surface of baffle section 62.

As the scoop advances the material angularly to position $n$ (about 165° drum rotary position), it moves over closure member 70, provided said closure member is in a closed position, and thence to position $d$ (about 180° drum rotary position) where the material descends through the auger assembly inlet chute 38 and thence is moved by the auger and fan to be flung through discharge port 79 to descend throughout at least the substantial axial length of the drum, assuming closure 99 is in an open position. If closure 99 is closed, the material is moved over the closure to about position $y$ where it falls off closure 99 to descend onto chute 97 and thence onto baffle 59 and/or directly into the confines of the tubular drum wall.

As material falls onto drum wall 12, the spiral blades 90 will cause such material to flow toward troughs 91 and be elevated to fall off the ends of the troughs adjacent the hood into the hopper inlet. However, due to the axial length of flange section 61, no significant amount of material passes between the clearance space between said flange section and mounting member 32.

The material flowing into the hopper inlet passes through the hopper outlet onto a scoop carrying material that had flowed through port 39 and cutout 52; or if the scoop does not have additional carrying capacity, the hopper fills up and material flows over the top edges of the hopper. However due to the size of the cutouts 52 and the fact that at least one scoop is always located angular between angularly adjacent edges of port 39 and the hopper outlet, an insufficient amount of material builds up on the lower portion of the hood wall 16 whereby sufficient material would flow under annular member 32 to have a material build up to the elevation of the lowermost part of seal 16a. This precludes undue wearing of the seal such as would occur if there were a build up of material adjacent the seal. As additional material is fed through the chute 36 and transferred into the drum in the aforementioned manner, the level builds up in the drum adjacent mounting member 32 and baffle section 60 sufficiently to be of a greater depth than the height of the troughs and mixing blades at their lowermost angular position and accordingly falls over the top of the troughs and mixing blades 90 and gradually the build up works to the end 13 of the drum. This procedure will continue until the drum is loaded, all the time the material being continuously mixed.

After loading through chute 36 is discontinued, the scoops remove substantially all the material on hood wall 16 adjacent port 39 whereby the material is transferred into the drum. Thereafter, mixing may be continued with material flowing through the hopper being elevated and then the elevated material being discharged through the auger assembly outlet, provided closure 99 is open. However, the scoops angularly between the hopper outlet and port 39 prevent any significant flow of material that has passed through the hopper moving generally in a direction opposite arrow 56 to a position adjacent port 39, i.e., the scoops at this time keeping the lowermost portion of the hood substantially free of material.

If the closure 99 is closed while material fed through chute 36 is being fed into the drum, after all or most of the material fed through chute 36 has been moved by the scoops over the closure 99 to descend into the drum, the closure 99 is moved to an open position. Now all or most of the material moved by the scoops over closure 70 descends through the auger inlet chute to be moved by the auger to the fan which flings the material through the auger outlet 79. Preferably the fan may be of a construction and driven at a speed that substantially all of the material will be propelled with a force sufficient that all of the material will hit the drum end wall. However, due to the spreading of material as it leaves the outlet 79, part of the material will impinge of the tubular drum wall, mostly that part of the drum wall that is moving angularly downwardly. Further, the spiders and trough 91 in moving angularly adjacent the outlet 79 move across the path of projection of material from outlet 79 to deflect material so that material descends to the level of material in the drum across substantially the entire axial length of the drum to increase the speed of mixing. With reference thereto, the drum is loaded up to a maximum of about 60–70 percent of the volumetric capacity thereof to leave a space for material to be projected through, the level of material in the drum being higher on the transverse side of the drum shaft that the hopper is located on than on the side the auger outlet is located on due to the drum being rotated in the direction of arrow 56. The auger motor need only be powered during the time material is being fed into the auger inlet chute.

With the auger being driven, the material will be thoroughly mixed in a matter of 2–3 minutes. To be mentioned is that the passage of the material through the auger assembly substantially increases the speed of mixing over and above that which would be obtained if the auger assembly were not provided. Further, if the auger assembly were not provided and used, structure, for example, such as disclosed in my above mentioned patents would have to be provided to produce adequate mixing and still the speed of mixing would not be nearly as great as that obtained by using an auger assembly such as disclosed herein.

After mixing is complete, the closure 70 is at least partially opened whereby material elevated to position n is free to flow into the discharge chute inlet axially between the closure and chute portion 81e. If the closure is only partially open, some of the material elevated to position n will be discharged through chute 81 and the rest will be moved over the closure to position d to descend into the auger housing.

The material falling through the inlet of the chute 81 passes through the outlet of chute 81 and into a bag or a suitable receptacle. The spiral blades 90 continuously feed material axially forwardly to the troughs which move the material forwardly and elevate the material to pass through the hopper to be subsequently moved by the scoops to an elevated position to be discharged through chute 81.

The emptying process is continued until the drum is emptied. Then the closure 70 is moved to a closed position to ready the apparatus of this invention for mixing another batch of material.

The first embodiment of the invention having been described, the structure of the second embodiment, generally designated 125, will now be set forth. The second embodiment of the invention is illustrated in FIGS. 6 and 7. The machine 125 includes a large cylindrical drum of the same construction and rotatably mounted in the same manner as that of the first embodiment. The drum has spiral blades and troughs such as previously described and includes a tubular drum wall 127 and spiders 132, 133, the drum being rotatably mounted on shaft 128.

There is provided a stationary hood, generally designated 130, having an axially extending, arcuate wall portion 131 that extends over a portion of approximately the upper angular one-half of the tubular drum wall 127 in a manner corresponding to the extension of the upper half of the hood tubular wall over the drum tubular wall of the first embodiment. Vertical, axially extending flanges 135a, 135b are joined to opposite lower edges portions, respectively, of the arcuate wall 131 to depend therefrom, there being a hood end wall 136 joined to the forward edges of the arcuate wall 131 and vertical flanges 135a, 135b. One end portion of shaft 128 extends through the central portion of the hood end wall 136, while the opposite end extends through the drum rear end wall (not shown).

Located generally diametrically opposite the top portion of arcuate wall 131 is a loading bin (sump) 139 into which the material to be transferred into the drum is fed. The bin has an arcuate bottom wall section 139a, preferably having a radius of curvature corresponding to that of the tubular wall of the drum, but curved about a point D that is at a substantially lower elevation than shaft 128 and horizontally offset a substantial distance from the shaft on the opposite side of the shaft from the hopper 175 which is of the same construction of the hopper of the first embodiment. One longitudinal edge of portion 139a is joined to flange 135a at a substantially lower elevation than wall 131, the opposite edge of portion 139a being joined to the lower edge of inclined portion 139c on the same transverse side of shaft 128 that the hopper is located. Inclined portion 139c extends linearly upwardly toward flange 135b at an angle to the horizontal, for example, an angle of about 45°–60° is satisfactory although it may be varied somewhat depending on the size of the drum. The upper edge of portion 139c is joined to the adjacent lower edge of wall portion 131 at a substantially higher elevation than the juncture of portions 135a, 139a but at a lower elevation than shaft 128. Thus portions 139a, 139c each in part extend to higher elevations than the lowermost part of the tubular drum wall 127.

The hood end wall has an inlet port 146 opening onto the inner surface of the bottom wall 139a, there being a chute 138 with a grilled floor plate 138a through which material is fed into the chute by gravity flow to be directed through inlet port 146 onto the loading bin bottom wall. The upper horizontal edge of inlet port 146 is located at a lower elevation than the lowermost portion of the drum.

A generally annular resilient seal member 142 is fixedly attached to the rearward edge of the arcuate wall 131 and the flange portion of the loading bin rear wall 139b, which is shaped to form a continuation of the axial rear portion of wall 131, to generally form a fluid seal with the drum outer wall 127 as the drum rotates relative to said seal and members 131 and 139b. The lower edge of wall 139b is joined to the adjacent edges of portions 139a, 139c. Thus the hood which includes the loading bin encloses the forward end of the drum.

In order to transfer material from the loading bin to an area within the confines of the drum tubular wall 127, there is provided te transfer mechanism generally designated 150. The transfer mechanism 150 includes axially spaced annular mounting flanges 151 and 152, the mounting flange 152 being closely adjacent the hood end wall 136. The mounting flange 151 at its outer peripheral edge is welded to the front edge of the drum outer wall 127. A plurality of circumferentially spaced scoops 158 are provided, the forward edge of each scoop 158 being welded to the adjacent outer peripheral edge of the mounting flange 152 and the opposite edge being welded to mounting flange 151.

A series of swing scoops (generally of the construction described in U.S. Pat. No. 3,269,707), generally designated 156, are pivotally supported on circumferentially spaced horizontal rods 159 which are located adjacent the radially outer edge portions of flanges 151, 152. Each scoop 156 has an outer axial edge 160 adapted to slide along the arcuate wall 139a of the loading bin to gather material through an outer opening 164 at the outer edges of the scoop. There is also an inner opening 162 at the inner side of the scoop from which the material is discharged as hereinafter described.

Each swing scoop has axially spaced somewhat triangular shaped wall portions (plates) 155, the rod 159 being extended through the apex portions thereof, and a curved wall 153 joined to the correspondingly curved base edges of portions 155. Wall 153 is curved such that the radially outer end portion thereof is of about the same curvature as wall portion 139a, while the upper end portion extends nearly vertical when the scoop is at the lowermost position in the loading bin. The inner edge of each generally triangular plate is of about the same length as the outer edge. A flanged cross brace 157 is attached to the apexed portions of the plates 155.

The leading edge 160 of the scoop curved wall 153, the outer edges of the plates 155 and a longitudinal edge of the cross brace define the outer opening 164 of a scoop. The inner opening 162 is defined by the inner edges of the plates 155, the inner edge 161 of the scoop curved wall and the respective edge of the cross brace 157.

Secured to the adjacent portions of the hood end wall is the hopper 175 and a baffle. Since the baffle is of the same construction as that described relative the first embodiment, it will only be briefly described with reference to the second embodiment.

The baffle of the second embodiment includes an arcuate section 166 extending adjacent the mounting members 151, 152 and having a slightly smaller radius of curvature than the inner radius of curvature of said members, a generally planar, inclined baffle section 167, a vertical transverse section 168 and an arcuate flange section 169. Sections 166–169 are joined together and mounted by the hood end wall 136 the same as members 58–61 of the first embodiment. The baffle of the second embodiment also includes an arcuate baffle section 170 which extends from the discharge chute 181 to flange section 169 and an arcuate baffle section 186 that corresponds to baffle sections 62 and 41, respectively, of the first embodiment. Section 186 extends between the discharge chute 181 and the inlet chute 148 of the auger assembly, generally designated 140, which are of the same construction and mounted in the same manner as the discharge chute 81 and the auger assembly of the first embodiment. A closure 190 is mounted by the hood end wall to selectively block the inlet of chute 148 in a similar manner as that set forth relative the closure 99 of the first embodiment. The inlet of the discharge chute is located beneath the scoop mounting member portions adjacent the location of the maximum elevation of said scoop mounting members 151, 152. A closure 182 for blocking the inlet of the discharge chute 181 is mounted by the hood end wall to extend outwardly thereof, there being provided brackets 183, 184 on the interior of the hood for slidably supporting the closure. The trailing edge of the closure underlies the leading edge of the baffle section 170, the closure being arcuately curved so that the scoops will move material thereover to the inlet chute 148 when the closure is in a closed condition. Also a chute 98 is mounted on the hood end wall adjacent chute 148 in the same manner and to perform the same function as the chute 98 of the first embodiment.

The structure for drivingly rotating the drum of the machine 125 relative to shaft 128 and the stationary hood 130 is the same as that illustrated and described relative to the first embodiment.

The structure of the second embodiment of the invention having been described, the operation thereof will now be briefly set forth. Assuming that the drum is in an emptied condition and being rotated, and that closure member 182 is in a closed condition; the particulate material to be mixed is dumped into the loading chute 138 through the grilled top plate 138a where under the action of gravity the material flows through the hood inlet port 146 and thence onto the floor 139a of the loading bin 139 to be located adjacent position s (0° rotary position of the drum) beneath and axially between flanges 151 and 152. As the drum rotates, the scoop 156 angularly rearwardly of the port 146 is advanced to be adjacent port 146 and has its outer edge 160 abutting against the bottom wall 139a of the loading bin to gather material into opening 164 and to drag the material over the loading bin bottom wall. As this scoop is carried by the rotation of the drum angularly toward the t position, due to the curvature of the bin bottom wall, and thereafter due to the angle of inclination of inclined wall 139c, the scoop 156 pivots about rod 159. As a result the scoop edge 160 moves more closely adjacent the outer peripheral edges of mounting members 152. Due to the horizontal offset of bottom wall 139a and the angle of inclination of inclined wall 139c, the amount of material falling over the radial inner edge of scoop wall 153 is substantially decreased from the amount that would fall over said edge if wall portion 139c were not offset and wall portion 139c inclined. That is, the hopper outlet opens to the path of travel of the scoops angularly in advance of the angularly rearward, but adjacent, swing scoop when the curved wall of said scoop is radially adjacent the minimum radial spacing between wall portion 139c and the inner peripheral edge of members 151, 152.

As this scoop 156 is advanced angularly past the t position, through the action of gravity, said scoop pivots such that its inner edge 161 abuts against the baffle section 170 to thereby prevent material falling out of the scoop and thence descencing to a lower level. Also at about this time the material is carried by the scoop 156 moves over the scoop arcuate wall 153 to be more closely adjacent baffle section 170 and subsequently through the inner scoop opening 162 to be dragged over baffle section 170.

As the scoop 156 advances the material angularly from the t position to position u, the material is moved over closure member 182, provided said closure member is in a closed position, and thence across baffle section 186 to position w where it descends through auger assembly chute 148 to be discharged from the auger assembly into the drum if closure 190 is in an opened position, or if in a closed position, to descend onto chute 98. At this time the material in the drum is moved forwardly by the spiral blades and is elevated by the troughs to, for the most part, fall into the inlet of the hopper and flow through the hopper outlet to fall onto a scoop 158, and/or a scoop 156 angularly rearwardly (direction opposite arrow 190) of the hopper outlet, and/or the inclined wall 139c angularly intermediate port 146 and flange 170; provided the scoops moving rearwardly adjacent the hopper outlet are not moving sufficient material adjacent the hopper outlet to prevent the flow of material downwardly therethrough. The scoops in being moved in the direction of arrow 190 prevent any substantial amount of material that flows downwardly through the hopper outlet moving to a location axially opposite port 146.

Subsequently the level of material builds up throughout the drum in the manner described relative the first embodiment. After the material has been thoroughly mixed as described with reference to the first embodiment, the closure 181 is moved to an open condition, and the material elevated by the scoops to position u discharges through the discharge chute. During this time the spiral blades continuously feed material axially fowardly and the troughs elevate the material in the drum to fall into the hopper inlet, then the material is elevated by the scoops to position u, and thence the elevated material is discharged through the discharge chute 181.

For the most part of the rotary cycle of the drum, the scoops 156 are limited in their "inward radial pivotal movement" about their respective pivot rods 159 through the provision of baffle sections 186, 166, 169 and 170. During a portion of the angular movement of the scoops 156 adjacent positions t and x, the maximum outward movement of the scoops about their pivots 159 is limited by the angularly adjacent portions of the vertical flanges of the hood; while angularly between chute 181 and the top edge of baffle section 166, the radial inwardly movement is limited by a flange (not shown) on the hood end wall.

To be mentioned is that scoops 158 do not have to be provided as long as there is structure for retaining mounting member 152 axially spaced from mounting member 151 rotating said mounting members together.

In the first embodiment the flange 61 may be forwardly elongated to be joined to the hood end wall. However with the second embodiment it is preferred that the flange 169 extend forwardly only a short distance axially more closely adjacent to the hood end wall than mounting member 151. The reason for this is that in the event the drive to the drum is stopped with material being elevated by the scoops, and no braking mechanism is provided, the weight of material on the scoops will cause the drum to rotate in the direction opposite arrow 190. If there were sufficient materil in the lower portion of the hood, the flange 169 extended to the hood end wall and such reverse rotation occurred, the material in the lower portion of the hood would become packed and occasionally result in scoops 156 being damaged. However, due to the spacing of the flange 169 from the hood end wall, material can be pushed up into the space axially between baffle sections 168, 167 and the hood end wall, and thus avoid such damage to the scoops 156.

With reference to each embodiment the hopper outlet opens to the scoops in the range of about 40°–75° angularly in advance of the lowermost position of the scoops of the first embodiment and the swing scoops 156 of the second embodiment.

As to each of the embodiments there are no troughs in the rear half of the drum such as described in my U.S. Pat. No. 3,552,721, nor baffles such as baffles 100 described in U.S. Pat. No. 3,259,372. Rather the only structure extending within the confines of the drum tubular wall are the shaft mounting members, the spiders 26, 27, the spiral blades 90, troughs 91 and the shaft 21 (shaft 128).

With the present invention, other than for possible leakage between the baffle structure and the scoop mounting structure, substantially all the material that is moved into the confines of the tubular wall of the drum is discharged through the auger outlet which facilitates the speed of mixing of the particulate material, and/or falls on the chute 98 to move thereover and descends to the level of the material in the drum.

In the event it is desired to mix liquid materials such as molasses with the particulate material with either of the embodiments of the invention, advantageously a plurality of discharge nozzles 196 are mounted in the auger assembly housing to discharge toward the auger shaft. A conduit 195 mounts the nozzles and extends outwardly through the hood end wall to be connected to a suitable source of liquid under pressure (not shown).

With each of the embodiments it is preferred that the auger housing outlet be located above the horizontal plane of the axis of rotation of the drum, and remote from the vertical plane of the drum axis of rotation on the side thereof that the portion of the tubular wall is moving downwardly when the drum is being rotated in its normal direction of rotation. Thus, with the drum rotating, material is discharged into the drum on the side of vertical plane of the drum axis that there is a smaller build up of material. Other than for possible leakage, all the material that is moved into the confines of the drum passes through the auger assembly outlet and/or passes over chute 98. The spiral blades 90 do not have the capability of moving as large amount of material forwardly per given unit of time as can be handled by the transfer mechanism, including the auger assembly, but do serve to permit emptying of the drum.

As may be seen in FIG. 3, the plate 65 extends to a higher elevation than the hopper inlet and more closely adjacent the drum shaft than the hopper inlet. As a result there is a smaller change of material elevated by a trough descending onto baffle 59 than if plate 65 was not so extended away from the hopper inlet.

Also to be mentioned is that the spiders and trough in moving axially adjacent the auger assembly outlet, deflect material passing therethrough to aid in increasing the speed of mixing of material.

What is claimed is:

1. In a machine for mixing particulate material, a frame, a generally horizontal shaft mounted on said frame, a drum having a tubular wall and a rear wall mounted on said shaft to revolve about the shaft axis, means for normally rotating the drum in a given direction, a stationary hood having an end wall at the opposite axial end of said tubular wall from the rear wall to enclose the opposite end of said tubular wall, an auger assembly attached to the hood end wall and having an outlet opening toward the rear wall for flinging particulate material through the outlet opening into the drum more than half the axial distance between said end wall and the rear wall, and hood and drum cooperating means, in part mounted by said hood, and in part by said drum to rotate therewith, for elevating material from a vertically lower position as the drum is rotated, and selectively discharging the elevated material exteriorly of said hood and alternately into the auger assembly, said auger assembly having inlet means for receiving elevated material from the hood and drum cooperating means.

2. The apparatus of claim 1 further characterized in that auger assembly comprises an auger housing having said outlet and the inlet means opening thereinto in spaced relationship to the outlet, and auger means mounted in the housing for rotation about an axis lying in a plane that is generally perpendicular to the axis of rotation of the drum to convey particulate material in the housing to the outlet.

3. The apparatus of claim 2 further characterized in that the auger means includes a rotary fan blade adjacent the outlet for imparting a propelling force to particulate material in the housing to project material through the outlet and over the substantially the entire axial length of the tubular wall.

4. The apparatus of claim 3 further characterized in that fan blade extends predominently radially outwardly and in the direction of the axis of rotation of the auger means.

5. The apparatus of claim 2 further characterized in that said outlet extends to a higher elevation than said horizontal shaft and is located substantially spaced from the horizontal shaft and horizontally between the vertical plane of the axis of rolation of the horizontal shaft and on the side of the last mentioned plane that the part of the drum moving angularly downwardly is located when the drum is being rotated in said given direction, and that the drum mounting means includes radially extending spiders mounted on the shaft adjacent the hood and joined to the tubular wall.

6. The apparatus of claim 5 further characterized in that said cooperating means includes spiral blades and trough means mounted on the drum to rotate therewith for moving material in the drum toward the hood and elevate the material as the drum rotates, a hopper fixedly attached to the hood and having an outlet, and an inlet adjacent the trough means and on the opposite side of the vertical plane from the auger assembly outlet to receive material elevated by the trough means, and scoop means attached to the drum to rotate therewith for receiving material discharged through the hopper outlet and elevating the received material as the drum rotates.

7. The apparatus of claim 6 further characterized in that the drum cooperating means includes annular means for mounting said scoops means on the drum in circumferentially spaced relationship to rotate with said drum, said scoop means including a plurality of angularly spaced scoops, and that the hood cooperating means includes a discharge chute mounted on the hood wall, said chute having an inlet axially beneath an upper portion of the drum cooperating means to receive material from a scoop and an outlet opening exteriorily of the scoop, said auger assembly inlet means having an inlet opening to receive material from a scoop that is at a substantially higher elevation than the axis of rotation of the horizontal shaft and the hopper inlet.

8. The apparatus of claim 7 further characterized in that the hood cooperating means includes a baffle fixedly secured to the hood and located in the hood, said baffle and annular means having cooperating means for blocking any substantial flow of material in the confines of the drum into the path of movement of the scoops other than through the hopper and from the uppermost scoop means angularly in advance of the chute and auger assembly inlets in the direction of rotation of the drum and angularly rearwardly of a location that is at a higher elevation than the horizontal shaft, the baffle cooperating means including arcuate baffle sections extending angularly between the hopper outlet and the discharge chute inlet, and the discharge chute inlet and the auger inlet means inlet respectively, the auger inlet means being angularly in advance of the discharge chute inlet in said given direction of rotation of the drum and being axially beneath an upper portion of the drum cooperating means, and that the hood cooperating means includes a closure mounted by the hood wall for movement between a position blocking flow of material from a scoop to the discharge chute inlet and a position permitting flow of material from a scoop to the discharge chute inlet.

9. The apparatus of claim 7 further characterized in that the annular means includes a pair of axially spaced, annular mounting members and that the scoop means includes a plurality of scoops rigidly attached to the annular mounting members, one of the mounting members being rigidly joined to the tubular wall radially intermediate the inner and outer circumferential edges thereof and the other mounting member having a plurality of angularly spaced cutouts to permit the flow of material into the path of movement of the scoops.

10. The apparatus of claim 7 further characterized in that the scoop means includes a plurality of angularly spaced scoops pivotally mounted on the annular means.

11. The apparatus of claim 7 further characterized in that the auger assembly outlet consists of the discharge opening for discharging material into the confines of the tubular wall that has been elevated by the scoop means, and that there is provided a closure for selectively blocking the auger assembly inlet opening, and a chute attached to the hood, extending beneath the uppermost scoops angularly in advance of the auger assembly inlet means to receive material carried by the uppermost scoops pass the auger assembly inlet means, and extending downwardly and axially rearwardly to discharge material toward the drum rear wall.

12. A machine for mixing particulate materials comprising a drum, means for mounting the drum to revolve about a substantially horizontal axis in one normal angular direction, said drum having a tubular wall and a rear end wall at one axial end thereof, a stationary hood enclosing the opposite end of the drum, said hood having an end wall adjacent the end of the drum opposite the drum rear wall, and hood and drum cooperating means in part mounted by said hood and in part by said drum to rotate therewith for elevating material from a low position to a higher position as the drum is rotated and selectively discharging at least part of the above mentioned elevated material exterior of the hood, and drum cooperating means including a plurality of scoops, first generally annular means for mounting said scoops on the drum in circumferentially spaced relationship to rotate with said drum, and second means for elevating material within the drum to an elevation intermediate the lower and uppermost portions of the drum and directing the last mentioned elevated material toward the hood end wall, said second means being mounted in the drum to rotate therewith and extending axially more closely adjacent to the rear wall than said scoops, the hood cooperating means including a discharge chute mounted on the hood wall, said chute having an inlet axially beneath an upper portion of the drum cooperating means to receive material from a scoop, and an outlet opening exteriorly of the hood, baffle means joined to the hood end wall and overhanging angularly lower scoops for directing material axially away from the hood end wall and blocking any substantial flow of material from the drum into the lower scoops, hopper means connected to at least one of the hood and the baffle means for receiving material from the second means and directing it into the path of movement of a scoop at an elevation vertically between the chute inlet and the lowermost portion of the drum, said hopper means having an outlet at a substantially higher elevation than the lowermost portion of the drum and located angularly between the lowermost portion of the drum and the chute inlet in the direction of normal rotation of the drum, a closure member for selectively blocking the flow of material from the upper portion of the drum cooperating means to the discharge chute, and a driven auger assembly mounted by the hood and having an inlet axially beneath an upper portion of the drum cooperating means to receive material from a scoop and an outlet opening within the hood for flinging material into the drum over half of the axial distance to the hood rear wall, the auger assembly outlet being located at a substantially higher elevation than the lower portion of the drum cooperating means and the auger assembly being mounted by the hood end wall to extend toward the rear wall.

13. The apparatus of claim 12 further characterized in that the auger assembly includes driven auger means for moving material from the auger assembly inlet to the auger assembly outlet, said auger means having an axis of rotation that extends predominently transversely and horizontally.

14. The apparatus of claim 12 further characterized in that the auger assembly inlet is located angularly in advance of the discharge chute inlet in the normally direction of rotation of the drum and at a substantially higher elevation than the axis of rotation of said drum.

15. The apparatus of claim 14 further characterized in that auger assembly outlet is at a higher elevation than the axis of rotation of the drum, opens rearwardly toward the rear wall and located between the vertical plane of the axis of rotation of the drum and the portion of the drum moving downwardly in the normal direction of rotation of the drum.

16. The apparatus of claim 15 further characterized in that the auger assembly includes an auger housing having the auger assembly outlet and driven auger means for moving particulate material in the housing to adjacent the auger assembly outlet and flinging the material through the auger assembly outlet to fall into the drum throughout the major portion of the length thereof including adjacent the rear wall.

17. The apparatus of claim 16 further characterized in that the drum mounting means includes a horizontal shaft, a first mounting member for connecting the rear wall to the shaft, a second mounting member mounted on the shaft adjacent the hood and a plurality of radially extending spiders for attaching the portion of the drum adjacent the hood to the second mounting member and that the second means includes a plurality of troughs and spiral blades joined to the drum tubular wall for moving material toward the hood as the drum rotates, the interior of the drum being free of structure axially between the rear wall and the spiders other than said mounting members, the shaft, the troughs and the spiral blades.

18. In a machine for mixing particulate material, a frame, an elongated horizontal shaft mounted on said frame, a drum having a tubular wall and a rear end wall mounted on said shaft to revolve about the shaft axis, means connected to said drum for drivingly rotating said drum in a given angular direction, said drum having a zero degree drum rotary position at the lowermost part of the drum, a stationary hood having an end wall axially spaced from the end of the tubular wall opposite said rear wall and an axial wall enclosing the end of the drum opposite the rear wall, said shaft extending through the hood end wall, a plurality of scoops, first means for mounting said scoops axially between the tubular wall in circumferentially spaced relationship radially adjacent the hood axial wall to rotate with the drum for elevating material from the lowermost portion of the hood, said hood having an inlet opening to the lowermost portion of the hood axial wall, a feed chute exterior of the hood for directing material through the hood inlet and into the path of movement of the scoops, a discharge chute attached to said hood end wall and having an inlet radially between the path of movement of the scoops and the shaft, a hopper fixedly attached to the hood radially between the path of movement of the scoops and the shaft, and angularly between the hood inlet and the discharge chute inlet in the direction the drum is driven, said hopper having an outlet opening adjacent the path of travel of the scoops and angularly in advance of the lowermost portion of the path of travel of the scoops for directing material to the scoops and an inlet at an elevation intermediate that of the discharge chute inlet and the hood inlet, means attached to the drum to rotate therewith for directing material within the drum to the hopper inlet and baffle means mounted by the hood and extending transversely above the lowermost scoops for blocking any substantial flow of material within the confines of the drum into the path of travel of the scoops other than that flowing through the hopper and angularly in advance of the discharge chute and auger assembly inlets and between said inlets and at a higher elevation than the axis of rotation of the drum, an auger assembly mounted on and within the hood, said auger assembly having an inlet radially between the path of movement of the scoops and the shaft at a higher elevation than the shaft angularly in advance of the hopper inlet to receive material elevated by the scoops, and an outlet opening toward the rear wall, and extending to an elevation that is higher than the shaft and that is substantially spaced from the axis of rotation of the shaft, said auger assembly including driven auger means for propelling material outwardly of trough the auger assembly outlet and toward the rear wall, including closely adjacent the rear wall and a closure on the hood for movement to a closed position for blocking the flow of elevated material to the inlet of at least one of the discharge chute and the auger assembly, the baffle means including an arcuate baffle section extending angularly between the hopper outlet and the closure in a closed position to block flow of material from the adjacent scoops back into the drum angular between the hopper outlet and the closure.

19. The apparatus of claim 18 further characterized in that the auger assembly inlet and the discharge inlet are angularly spaced and that the baffle means includes an arcuate baffle section extending between the auger assembly inlet and the discharge chute inlet and that the auger means is elongated and extends predominently horizontally in a generally transverse direction relative the axis of rotation of the shaft.

20. The apparatus of claim 18 further characterized in that the first means includes a plurality of troughs, each trough having an elongated edge joined to the tubular wall and being inclined to have the rearwardmost portion thereof angularly in advance of the front portion thereof, said troughs extending radially adjacent the baffle means to cooperate therewith for retaining material on the troughs as the troughs move toward and angularly adjacent the hood inlet, and spiral means having an edge joined to the tubular wall and extending to the rear wall for directing material axially toward the troughs as the drum rotates in said given angular direction.

21. The apparatus of claim 20 further characterized in that the drum mounting means includes a plurality of radially extending spiders adjacent the hood, a spider mounting member on the shaft and a rear wall mount mounted on the shaft, the drum beig free of interior structure axially between the spiders and the rear wall mount other than for the troughs and the spiral means, and that the auger assembly includes rotary fan means for propelling particles through the auger assembly outlet with sufficient force to impinge on the drum rear wall.

* * * * *